United States Patent Office 2,793,629
Patented May 28, 1957

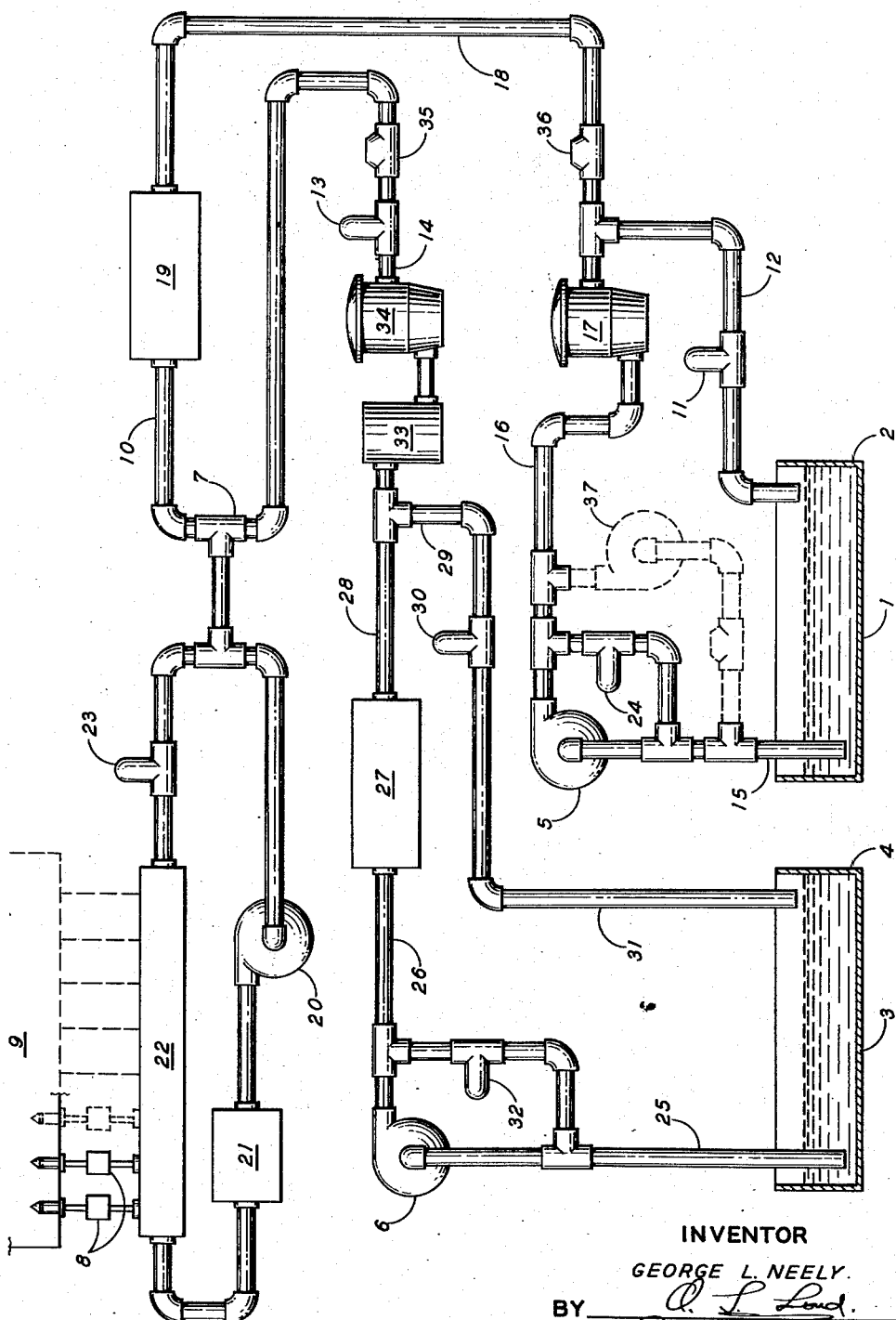

2,793,629

INTERNAL COMBUSTION ENGINE FUEL SYSTEMS

George L. Neely, Berkeley, Calif., assignor, by mesne assignments, to California Research Corporation, San Francisco, Calif., a corporation of Delaware Application December 2, 1955, Serial No. 550,675

6 Claims. (Cl. 123—30)

This invention relates to internal combustion engine fuel systems, and particularly compression ignition engine fuel systems capable of supplying a plurality of dissimilar fuels to high and medium speed compression ignition engines; and an object of the invention is to provide novel methods and apparatus for supplying high and medium speed compression ignition engines with light distillate fuel under at least starting and idling conditions, and for automatically satisfying additional fuel requirements of said engines at higher loads and speeds with a mixture of said distillate fuel and heavy residual fuel.

The following will provide an indication of the scope intended herein for various terms: The term "dissimilar fuel" is intended to include, for example, fuels that are dissimilar in viscosity at a given temperature, or in miscibility, volatility, cetane number, or in any other characteristic by which the fuels may be distinguished. The term "residual fuel" or "heavy residual fuel" is intended to include, for example, particularly those hydrocarbon fuel oils predominantly comprising hydrocarbons boiling above 600° F., which will generally have a viscosity in Saybolt Seconds Universal (S. S. U.) lying in the range 100–10,000 S. S. U. at 100° F. The term "distillate fuel" is intended to include, for example, particularly those hydrocarbon fuel oils predominantly comprising hydrocarbons boiling below 600° F., which will generally have a viscosity below 1,000 S. S. U. at 100° F. The term "high and medium speed engines" is intended to include generally those compression ignition engines having speeds above 500 R. P. M., for example, the usual railroad diesel engines. As used herein, the term "low speed engines" is intended to include generally those compression ignition engines having speeds below 500 R. P. M., for example, large stationary engines and the usual marine diesel engines.

This invention is applicable to internal combustion engines generally, and to compression ignition engines operating at all speed ranges, although as the following discussion will show it is particularly useful in connection with high and medium speed compression ignition engines.

Because high and medium speed compression ignition engines generally have smaller bore diameters than the low speed compression ignition engines, it is easier for part of the fuel stream being injected into a cylinder of a high or medium speed engine to traverse the combustion chamber before it is vaporized, especially if the burning of heavier fuels is attempted, and if complete vaporization does not take place the unvaporized portions cause engine gumming. Also, especially on light loads or at idle, there is more tendency in the high and medium speed engines for the fuel, especially heavier fuels, to fail to vaporize completely, because of the short time the engines allow for vaporization and combustion. As a consequence of the reduced combustion chamber temperature because of the light engine load, and because of the further reduction in temperature due to incomplete vaporization and combustion, there is an increased tendency for the combustion to become quenched. Again, the unvaporized fuel portions cause engine gumming. In view of the foregoing it is particularly desirable and necessary, if the burning of residual fuels in a high or medium speed compression ignition engine is to be attempted, to first start the engine on the lighter distillate fuel, and to introduce the heavier fuel into the engine later when increased combustion chamber temperatures are more favorable for satisfactory burning of the heavier fuel. The optimum engine speed and load conditions when introduction of the heavier fuels into an engine most satisfactorily can be initiated will vary from engine to engine.

It has been suggested that the distillate fuel supply should be shut off when the operating conditions of a compression ignition engine are such that introduction of the heavier residual fuels can be initiated. However, such a course means that, because of the high viscosity of the residual fuel, with other factors being equal, the combustion chamber temperatures necessary to burn the residual fuel alone must be appreciably higher than those required to burn a mixture of residual and distillate fuel. Furthermore, to reduce the residual fuel viscosity by heating prior to injection to avoid incomplete vaporization in the combustion chamber is likely to subject sensitive parts of injectors and pump valves to prohibitive uneven thermal expansion. Therefore, it is desirable to reduce the residual fuel viscosity by combining distillate fuel with residual fuel. In this manner less residual fuel preheating is necessary, and the addition of relatively small proportions of distillate fuel to residual fuel will result in a mixture with a viscosity markedly lower than the initial viscosity of its residual fuel components. In view of the foregoing it is an object of this invention to provide methods and apparatus for operating high and medium speed compression ignition engines on distillate fuels at some load and speed conditions and on mixtures of distillate and residual fuels at other load and speed conditions.

In accordance with the present invention simple, effective and efficient methods and apparatus are provided for operating an internal combustion engine on a mixture of two dissimilar fuels by starting the engine on a first fuel and by providing means responsive to a decrease in pressure on said first fuel as the engine speed or load increases to add to the fuel stream of said first fuel a second fuel at predeterminable rates.

The novel features of the present invention are set forth with particularity in the appended claims. The invention will best be understood, however, both as to organization and operation, and additional objects and advantages thereof will be apparent, from the following description of a specific embodiment, when read in conjunction with the accompanying drawing, in which the single figure is a schematic diagram of the apparatus of the invention as incorporated in a dual fuel system on a compression ignition internal combustion engine.

Referring now to the drawing, distillate fuel 1 is pumped from distillate fuel tank 2 and residual fuel 3 is pumped from residual fuel tank 4 by fuel transfer pumps 5 and 6, respectively, to mixing T 7 and thence as a fuel mixture to fuel injectors 8 of engine 9. However, as will be shown, this fuel mixture is only supplied to engine 9 at engine speeds above at least idling speeds. Engine 9 is started and idled on distillate fuel only, and residual fuel is not added to the distillate fuel until the speed of engine 9 is at least greater than idling speed. Alternatively, the addition of residual fuel may be made dependent upon a predetermined increase in the load on engine 9, although the following discussion of the preferred embodiment shown will be limited to consideration of a predetermined speed increase only.

Still referring to the drawing, the complete operation of the fuel system shown is as follows: Distillate fuel transfer pump 5 is selected with a capacity and other characteristics so that it will maintain in line 10 against the back presure of engine 9 at least a predetermined minimum pressure, for example 50 p. s. i., during all speeds at which it is desired that engine 9 shall operate on distillate fuel only; for example, at starting, idling and predetermined low running speeds. At these speeds pump 5 will therefore be capable of supplying the total fuel requirements of engine 9 at at least the said predetermined minimum pressure in line 10.

Valve 13 is selected and set to remain closed to prevent any fluid flow through line 14 so long as the pressure in line 10 does not fall below the above-mentioned predetermined minimum pressure, and to open automatically when the pressure in line 10 falls below said predetermined minimum pressure. It is important that valve 13 be set to remain closed at engine starting and idling speeds at least, and preferably at lower engine running speeds, to prevent the flow of residual fuel 3 to engine 9 at those speeds.

Relief valve 11 in line 12 is set to open when the pressure in line 10 rises to a predetermined maximum value, for example 75 p. s. i., to allow distillate fuel 1 to flow back to distillate fuel tank 2, through line 12, and thus to prevent unnecessarily high pressure in line 10.

With the various valves set as described above, with circulating pump 20 in operation, and with distillate fuel pump 5 maintaining at least the desired minimum pressure on distillate fuel 1 in line 10, engine 9 is started in a conventional manner on distillate fuel 1 and allowed to idle on distillate fuel 1 until desired engine operating temperatures are attained. While engine 9 is thus idling, distillate fuel 1 is being pumped by transfer pump 5 from distillate fuel tank 2 through line 15, pump 5, line 16, filter 17, line 18, hot water heater 19, line 10, mixing T 7, and into the closed loop circulating system comprising circulating pump 20, orifice mixer 21, header 22, and relief valve 23. Filter 17 is a conventional fuel filter. Relief valve 24 is selected and set as desired to protect pump 5. Circulating pump 20 maintains the fuel or fuel mixture in fuel header 22 in a continuous state of circulation around the closed loop circulating system comprising circulating pump 20, orifice mixer 21, header 22 and relief valve 23, in order to counteract fuel incompatibility and maintain fuel mixture uniformity when fuel mixtures are being circulated. The said closed loop circulating system is described in more detail in the copending patent application of Primo L. Pinotti, Serial No. 516,071, filed June 17, 1955, entitled "Dual Fuel System for Compression Ignition Engines," which issued August 14, 1956, as Patent No. 2,758,579. Pressure relief valve 23 is provided to maintain a desired pressure in fuel header 22, against the action of circulating pump 20, and fuel at this pressure is forced from the fuel stream circulating through header 22 through injectors 8 to engine 9, in accordance with the fuel requirements of engine 9.

With engine 9 thus operating on distillate fuel 1, fuel transfer pump 6 is started to warm up residual fuel 3 by pumping it through line 25, pump 6, line 26, hot water heater 27, line 28, line 29, relief valve 30, and line 31 back to residual fuel tank 4. Hot water heater 27 is supplied with continuously circulating hot water through lines (not shown) from the hot water jacket of engine 9. Relief valve 30 is set below the value at which relief valve 32 is set, for example at 75 p. s. i. Relief valve 32 is set at a somewhat higher value, for example 85 p. s. i., and serves to protect transfer pump 6. Valve 13 is responsive only to a drop in pressure on distillate fuel 1 in line 10, and will therefore remain closed and cause residual fuel 3 to circulate back to residual fuel tank 4 through line 31 until an increase in the speed or load of engine 9 causes the pressure on distillate fuel 1 in line 10 to drop to the value at which valve 13 is set to open. When residual fuel 3 has circulated through heater 27 until it has reached a desired temperature the throttle of engine 9 may be advanced to cause higher engine speeds and thus initiate flow of residual fuel to engine 9, as will now be described.

As the throttle of engine 9 is advanced to cause higher engine speeds or to satisfy increased fuel requirements of engine 9 due to higher loads, the pressure on distillate fuel 1 in line 10 will drop, because of the increased fuel requirements of engine 9. When this pressure drops to the value at which valve 13 is set to open, residual fuel transfer pump 6 will pump residual fuel 3 from residual fuel tank 4 through lines 25 and 26, residual fuel heater 27, residual fuel electric heater 33, filter 34, line 14, valve 13 and valve 35 to mixing T 7. At mixing T 7, residual fuel 3 is mixed with distillate fuel 1 and the resulting mixture is circulated around the closed loop circulating system comprising circulating pump 20, orifice mixer 21, header 22, and relief valve 23. As is the case when engine 9 is operating on distillate fuel only, the fuel requirements of engine 9 are taken from this circulating fuel stream and forced through injectors 8 into engine 9. Residual fuel electric heater 33 may be provided, if desired, to further aid in maintaining residual fuel 1 flowing to mixing T 7 at a desired temperature. Heater 33 may be energized, for example, from low voltage electrical wiring (not shown) attached to the regular electrical system of engine 9. Filter 34 is a conventional fuel filter.

Valves 35 and 36 are conventional check valves that are provided as safety measures to insure against either distillate fuel 1 or residual fuel 3 being pumped to the fuel tank of the other upon valve failure or other malfunctioning of the fuel system.

Pump 37, shown dotted, is a spare pump that may be connected as shown, if desired, and arranged to pump simultaneously and in parallel with pump 5 to permit full load operation on distillate fuel only. Under these conditions the decrease in pressure on distillate fuel 1 in line 10 sufficient to actuate valve 13 will not take place because pump 37 will be aiding pump 5 in the maintenance of pressure on distillate fuel 1 in line 10.

Distillate fuel heater 19 is a hot water heater that may be provided, if desired, to heat distillate fuel 1 to approximately the temperature of residual fuel 3 at mixing T 7, so that there will be no tendency for distillate fuel 1 to cool residual fuel 3 at and beyond mixing 7 and thus increase the viscosity thereof.

If desired, means can be provided in conjunction with the fuel system shown which is responsive to combustion chamber temperature or exhaust temperature to prevent flow of residual fuel 3 to engine 9 until combustion chamber temperature has reached a value sufficient to permit satisfactory combustion of a mixture of residual fuel 3 and distillate fuel 1.

If desired, the pressure drop in distillate fuel 1 due to an increase in speed or load of engine 9 can be used to start residual fuel pump 6 instead of opening valve 13. In this manner it is not necessary that residual fuel pump 6 be in continuous operation; however it is desirable that residual fuel 3 in tank 4 be kept heated to desired operating temperatures.

It will be appreciated that the various pumps and valves of the apparatus of this invention can be so selected and adjusted that residual fuel 3 will be added to the flow of distillate fuel 1 to engine 9 at any desired speed and load conditions of engine 9. For some engines it may be desirable to have a low capacity distillate fuel pump 5, and to cut in residual fuel 3 to engine 9 at low engine speeds. Other engines, because of their inherent operating characteristics, may make it desirable to postpone the addition of residual fuel 3 to the flow of distillate fuel 1 until higher engine operating speeds have been attained.

From the foregoing it may be seen that the present invention operates in a novel and effective manner to allow an internal combustion engine, and particularly a compression ignition internal combustion engine, to be started and run at low speeds or loads on a first fuel at at least a predeterminable minimum pressure, and to be automatically switched at higher speeds or loads to a mixture of said first fuel and a second fuel, in response to a pressure drop on said first fuel below said predeterminable minimum pressure due to an increase in fuel requirements of the engine at the higher speeds or loads. The said first fuel is supplied to the engine at the said low speeds at rates up to a predeterminable maximum rate which is dependent upon various factors, including the characteristics of the pump that pumps said first fuel. Engine fuel requirements in excess of this predeterminable maximum rate are automatically supplied by said second fuel.

Although only specific arrangements and modes of construction and operation of the present invention have been described and illustrated, numerous changes could be made in those arrangements and modes without departing from the spirit of the invention. All such changes that fall within the scope of the appended claims are intended to be embraced thereby.

I claim:

1. The method of operating an internal combustion engine on a mixture of two dissimilar fuels, which comprises starting said engine on a first of said two fuels, pumping said first fuel to said engine under at least a predeterminable minimum pressure at idling conditions of said engine, and initiating flow of the second of said two fuels to said engine in response to a decrease in pressure on said first fuel below said predeterminable minimum pressure caused by an increase in fuel requirements of said engine above the fuel requirements of said engine at idling conditions.

2. The method of operating an internal combustion engine on a mixture of two dissimilar fuels, which comprises supplying said engine with a first of said fuels at rates at least sufficient to supply the total fuel requirements of said engine under at least starting and idling conditions, maintaining said rates at not more than a predeterminable maximum rate, supplying the second of said fuels to said engine at rates sufficient to supply the fuel requirements of said engine in excess of said predeterminable maximum rate, and maintaining a continuous circulation of a predetermined volume of said fuel mixture prior to introducing it into said engine.

3. The method of operating an internal combustion engine on a mixture of two dissimilar fuels, which comprises supplying at least the starting and idling fuel requirements of said engine with a first of said fuels at flow rates up to a predeterminable rate, initiating flow of the second of said fuels to said engine in response to a pressure drop on said first fuel due to an increase in engine fuel requirements above said predeterminable rate, and maintaining flow of the second of said fuels to said engine at rates sufficient to satisfy said increase in fuel requirements.

4. Apparatus for operating an internal combustion engine on two dissimilar fuels, comprising a source of a first fuel, a source of a second fuel, means for starting and idling said engine on said first fuel, means for limiting the pressure on said first fuel to a predeterminable maximum value, and means responsive to a predeterminable drop of said fuel pressure below said predeterminable maximum value for initiating flow of said second fuel to said engine.

5. Apparatus for operating an internal combustion engine on two dissimilar fuels, comprising a source of a first fuel, a source of a second fuel, means for supplying all fuel requirements of said engine up to a predeterminable engine speed with said first fuel, means for supplying all fuel requirements of said engine at speeds above said predeterminable speed with a mixture of said first and second fuels, and means for continuously circulating said mixture in a closed loop prior to introducing it into said engine.

6. Apparatus for operating an internal combustion engine on two dissimilar fuels, comprising a source of a first fuel, a source of a second fuel, means for supplying to said engine said first fuel at flow rates up to a predeterminable maximum flow rate, means for limiting the pressure on said first fuel flowing to said engine to a predeterminable maximum value, means responsive to a predeterminable drop of said fuel pressure below said predeterminable maximum value for initiating a flow of said second fuel to said engine in addition to the flow of said first fuel to said engine, means for mixing said flow of second fuel with said flow of first fuel prior to introducing said two fuels into the combustion chambers of said engine, and means for introducing the resulting mixture of said two fuels into the combustion chambers of said engine.

References Cited in the file of this patent

UNITED STATES PATENTS

| 1,105,016 | Bassford | July 28, 1914 |
| 2,221,405 | Nallinger | Nov. 12, 1940 |
| 2,708,916 | Davids | May 24, 1955 |

FOREIGN PATENTS

| 356,994 | Great Britain | Sept. 17, 1931 |
| 627,261 | Germany | Mar. 11, 1936 |
| 405,735 | Italy | Nov. 19, 1942 |